US012759888B2

(12) United States Patent
Xie

(10) Patent No.: US 12,759,888 B2
(45) Date of Patent: Oct. 13, 2026

(54) SYNTHESIS OF ALUMINOSILICATE MOLECULAR SIEVES OF SWY FRAMEWORK TOPOLOGY

(71) Applicant: CHEVRON U.S.A. INC., San Ramon, CA (US)

(72) Inventor: Dan Xie, El Cerrito, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 489 days.

(21) Appl. No.: 18/510,320

(22) Filed: Nov. 15, 2023

(65) Prior Publication Data

US 2024/0174522 A1 May 30, 2024

Related U.S. Application Data

(60) Provisional application No. 63/384,627, filed on Nov. 22, 2022.

(51) Int. Cl.
*C01B 39/24* (2006.01)
*C01B 39/20* (2006.01)

(52) U.S. Cl.
CPC ............ *C01B 39/24* (2013.01); *C01B 39/205* (2013.01)

(58) Field of Classification Search
CPC ....... C01B 39/24; C01B 39/205; C01B 39/48; C01B 39/04; C01B 39/02; C01B 39/265; B01J 37/04; B01J 37/30; C07C 5/222
USPC ........................................................ 423/700
See application file for complete search history.

(56) References Cited

U.S. PATENT DOCUMENTS 10,213,776 B2 2/2019 Casci et al.
2019/0382275 A1* 12/2019 Xie ......................... C01B 39/48
2022/0333519 A1 10/2022 Chitac et al.

OTHER PUBLICATIONS

A. Turrina, R. Garcia, A.E. Watts, H.F. Greer, J. Bradley, W. Zhou, P.A. Cox, M.D. Shannon, A. Mayoral, J.L. Casci and P.A. Wright "STA-20: An ABC 6 Zeotype Structure Prepared by Co-Templating and Solved via a Hypothetical Structure Database and STEM-ADF Imaging" Chem. Mater. 2017, 29, 2180-2190.

R.G. Chitac, J. Bradley, N.D. Mcnamara, A. Mayoral, A. Turrina and P.A. Wright "Designed Synthesis of STA-30: A Small-Pore Zeolite Catalyst with Topology Type SWY" Chem. Mater. 2021, 33, 5242-5256.

C. Isaac, J-L. Paillaud, T.J. Daou and A. Ryzhikov "Synthesis of BEC-type germanosilicates with asymmetric diquaternary ammonium salts" Micropor. Mesopor. Mater. 2021, 312, 110804.

* cited by examiner

*Primary Examiner* — Coris Fung
*Assistant Examiner* — Remy Frederic Lalisse
(74) *Attorney, Agent, or Firm* — Terrence Flaherty

(57) ABSTRACT

A method for synthesizing an aluminosilicate molecular sieve of SWY framework topology via interzeolitic conversion is described. The method includes (1) a step of preparing a reaction mixture containing an aluminosilicate zeolite of FAU framework topology, a structure directing agent comprising a 1-methyl-1-[7-(trimethylammonio)heptyl]piperidinium cation, a source of an alkali metal cation, a source of hydroxide ions, and water; and (2) a step of heating the reaction mixture to obtain an aluminosilicate molecular sieve of SWY framework topology.

9 Claims, 2 Drawing Sheets

SYNTHESIS OF ALUMINOSILICATE MOLECULAR SIEVES OF SWY FRAMEWORK TOPOLOGY

CROSS REFERENCE TO RELATED APPLICATIONS

This application claims the priority benefit of U.S. Provisional Application No. 63/384,627, filed Nov. 22, 2022, the disclosure of which is incorporated herein by reference.

FIELD

This disclosure relates to methods for preparing aluminosilicate molecular sieves having SWY framework topology.

BACKGROUND

Molecular sieves are crystalline microporous materials formed by corner-sharing TO4 tetrahedra (T=Si, Al, P, Ge, B, Ti, Sn, etc.), interconnected by oxygen atoms to form pores and cavities of uniform size and shape precisely defined by their crystal structure. Molecular sieves have important commercial applications as absorbents, ion-exchangers and catalysts.

Molecular sieves are classified by the International Zeolite Association (IZA) according to the rules of the IUPAC Commission on Molecular Sieve Nomenclature. Once the topology of a new framework is established, a three-letter code is assigned. This code defines the atomic structure of the framework, from which a distinct X-ray diffraction pattern can be described.

SWY framework topology molecular sieves are members of the ABC-6 family of zeotype structures. SWY framework topology materials exhibit the 12-layer stacking sequence AABAABAACAAC and contain parallel columns of can cages and double 6-ring (d6r) units and of gme and larger swy cages, with the latter two types of cages connected via 8-membered ring windows. Examples of molecular sieves having SWY framework topology include STA-20 and STA-30. SWY molecular sieves have shown attractive properties as catalysts or catalyst components for methanol-to-olefins (MTO) processes and for the selective catalytic reduction (SCR) of nitrogen oxides.

The composition and characterizing X-ray diffraction pattern of aluminophosphate STA-20 are disclosed in U.S. Pat. No. 10,213,776, which also describes the synthesis of the molecular sieve in the presence of an alkylamine (e.g., trimethylamine) and 1,6-(1,4-diazabicyclo [2.2.2]octane) hexyl (diDABCO-C6) cations as structure directing agents.

A. Turrina and P. A. Wright et al. (Chem. Mater. 2021, 33, 5242-5256) disclose aluminosilicate STA-30 and its synthesis in the presence of 1,8-(1,4-diazabicyclo [2.2.2]octane) octyl (diDABCO-C8) and potassium cations as structure directing agents.

According to the present disclosure, it has now been found that aluminosilicate molecular sieves of SWY framework topology can be synthesized via interzeolite transformation from high silica FAU zeolites in the presence of a structure directing agent comprising a 1-methyl-1-[7-(trimethylammonio) heptyl]piperidinium cation.

SUMMARY

In one aspect, the present disclosure relates to a method of synthesizing an aluminosilicate molecular sieve of SWY framework topology, the method comprising: (1) preparing a reaction mixture comprising: (a) an aluminosilicate zeolite of FAU framework topology, (b) a structure directing agent comprising a 1-methyl-1-[7-(trimethylammonio) heptyl]piperidinium cation, (c) a source of an alkali metal cation, (d) a source of hydroxide ions, and (e) water; and (2) heating the reaction mixture to obtain an aluminosilicate molecular sieve of SWY framework topology.

In another aspect, the present disclosure relates to an aluminosilicate molecular sieve of SWY framework topology and, in its as-synthesized form, comprising 1-methyl-1-[7-(trimethylammonio)heptyl]piperidinium cations in its pore structure.

DETAILED DESCRIPTION

Definitions

Figure 1:
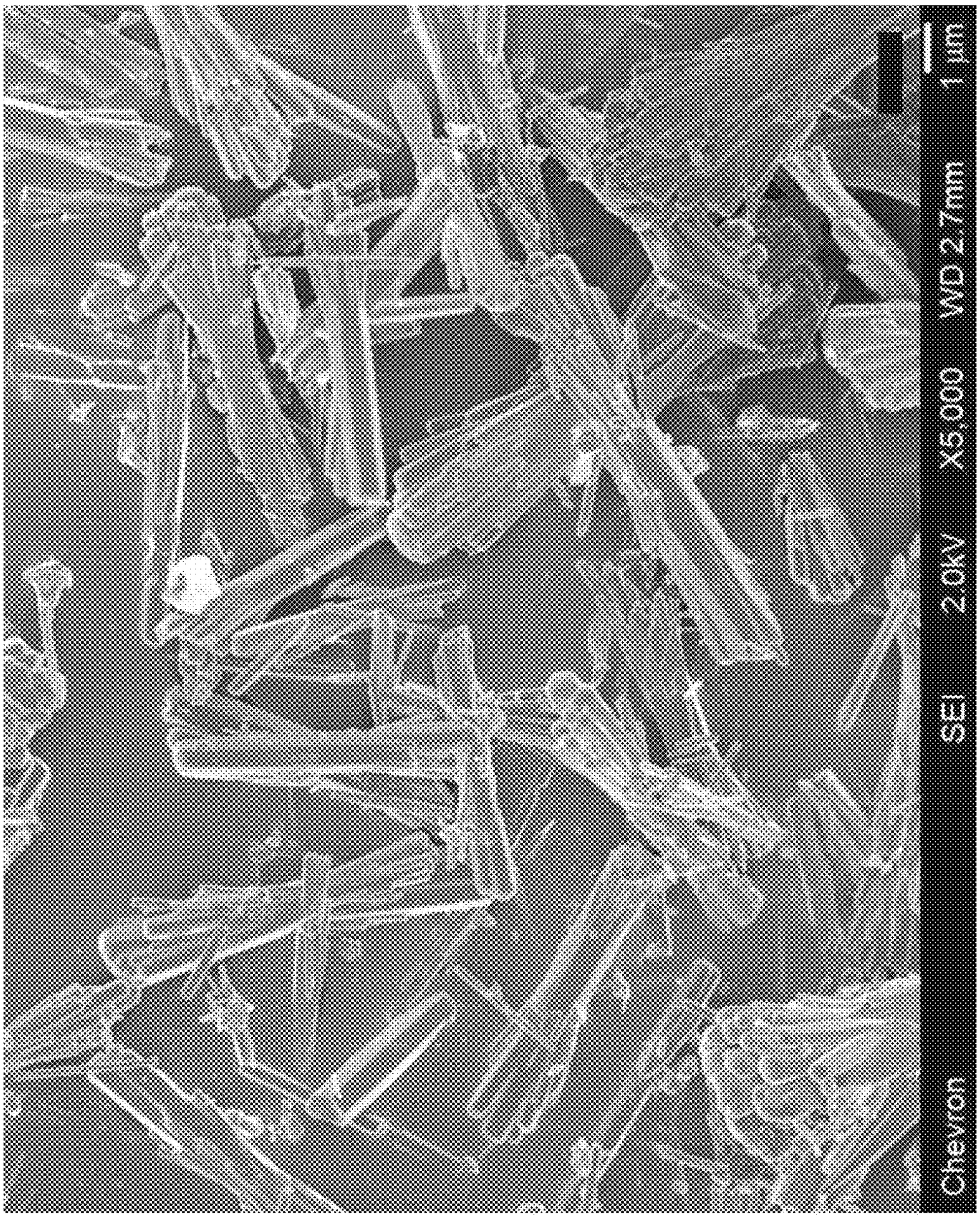
FIG. 1 shows a Scanning Electron Microscopy (SEM) image of the as-synthesized SWY material of Example 1.

The term "SWY" refers to an SWY type topology or framework as recognized by the International Zeolite Association (IZA) Structure Commission.

The term "FAU" refers to an FAU type topology or framework as recognized by the IZA Structure Commission and the term "FAU zeolite" means an aluminosilicate in which the primary crystalline phase is FAU.

The "as-synthesized" (or "as-made") aluminosilicate molecular sieves of the present disclosure (i.e., before optional thermal treatment or other treatment to remove the structure directing agent from the pores) typically include the structure directing agent, one of the components of the reaction mixture, within their pores. The aluminosilicate molecular sieves of the present disclosure where part or all of the structure directing agent has been removed (e.g., via thermal treatment or other treatment to remove the structure directing agent from the pores), are at least partially calcined or "as-calcined" materials.

Reaction Mixture

In general, an aluminosilicate molecular sieve of SWY framework topology can be synthesized by: (1) preparing a reaction mixture comprising: (a) an aluminosilicate zeolite of FAU framework topology, (b) a structure directing agent [Q] comprising a 1-methyl-1-[7-(trimethylammonio) heptyl]piperidinium cation, (c) a source of an alkali metal cation [M], (d) a source of hydroxide ions [OH], and (e) water; and (2) heating the reaction mixture to obtain an aluminosilicate molecular sieve of SWY framework topology.

The reaction mixture can have a composition, in terms of molar ratios, within the ranges shown in Table 1.

TABLE 1

| Reactants | Useful | Exemplary |
|---|---|---|
| $SiO_2/Al_2O_3$ | 20 to 100 | 25 to 80 |
| $Q/SiO_2$ | 0.05 to 0.50 | 0.15 to 0.40 |
| $M_2O/SiO_2$ | 0.01 to 1.00 | 0.02 to 0.30 |

TABLE 1-continued

| Reactants | Useful | Exemplary |
|---|---|---|
| $OH/SiO_2$ | 0.10 to 1.00 | 0.40 to 0.70 |
| $H_2O/SiO_2$ | 10 to 80 | 15 to 40 |

The aluminosilicate zeolite of FAU framework topology type can be single type of aluminosilicate FAU zeolite or a mixture of two or more aluminosilicate FAU zeolites. The aluminosilicate FAU zeolite can be zeolite Y. The aluminosilicate FAU zeolite can be two or more zeolites Y having different $SiO_2/Al_2O_3$ molar ratios.

The reaction mixture contains one or more sources of alkali cation [M]. The alkali metal is preferably selected from the group consisting of sodium, potassium, lithium, rubidium, and mixtures thereof, preferably sodium and/or potassium, more preferably potassium. The sodium source, when present, may be sodium hydroxide, sodium aluminate, sodium silicate, sodium aluminate or sodium salts such as NaCl, NaBr or sodium nitrate. The potassium source, when present, may be potassium hydroxide, potassium aluminate, potassium silicate, a potassium salt such as KCl or KBr or potassium nitrate. The lithium source, when present, may be lithium hydroxide or lithium salts such as LiCl, LiBr, LiI, lithium nitrate, or lithium sulfate. The rubidium source, when present, may be rubidium hydroxide or rubidium salts such as RbCl, RbBr, RbI or rubidium nitrate.

The structure directing agent [Q] comprises a 1-methyl-1-[7-(trimethylammonio)heptyl]piperidinium cation, represented by the following structure (1):

(1)

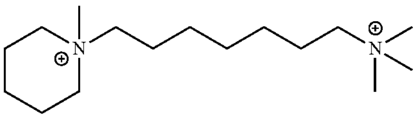

The structure directing agent [Q] may be present in any suitable form, for example as a halide, such as an iodide or a bromide, or as a hydroxide, for instance in its hydroxide form.

The synthesis mixture contains at least one source of hydroxide ions [OH]. For example, hydroxide ions can be present as a counter ion of the structure directing agent [Q]. Suitable sources of hydroxide ions can also be selected from the group consisting of alkali metal hydroxides, ammonium hydroxide, and mixtures thereof; such as from sodium hydroxide, potassium hydroxide, lithium hydroxide, rubidium hydroxide, ammonium hydroxide, and mixtures thereof; more often sodium hydroxide, potassium hydroxide, lithium hydroxide, ammonium hydroxide, and mixtures thereof; most often sodium hydroxide and/or potassium hydroxide.

The reaction mixture can further comprise seed crystals of a crystalline molecular sieve material, such as a crystalline molecular sieve of SWY framework topology. The amount of seed crystals is not particularly limited and typically ranges from 0.1 to 10 wt. % based on 100 wt. % of $SiO_2$ in the framework structure of the aluminosilicate FAU zeolite, preferably from 0.5 to 5 wt. % based on 100 wt. % of $SiO_2$ in the framework structure of the aluminosilicate FAU zeolite.

The reaction mixture can be prepared by any conceivable means, wherein mixing by agitation is preferred, preferably by means of stirring. The reaction mixture can be prepared in batch, continuous, or semi-continuous mode.

The reaction mixture can be in the form of a solution, a colloidal dispersion (colloidal sol), gel, or paste, with a gel being preferred.

Crystallization and Post-Synthesis Treatment

The reaction mixture is then subject to crystallization conditions suitable for the aluminosilicate SWY molecular sieve to form. Crystallization may be carried out under static or stirred conditions in a suitable reactor vessel, such as for example Teflon® lined or stainless steel autoclaves, placed in a convection oven maintained at an appropriate temperature. Preferably, the crystallization is carried out under autogenous pressure, preferably in an autoclave.

The crystallization is typically carried out at a temperature of 100° C. to 200° C. (e.g., 120° C. to 170° C.) for a time sufficient for crystallization to occur at the temperature used. For instance, at higher temperatures, the crystallization time may be reduced. For instance, the crystallization conditions may include heating for a period of from 1 day to 20 days (e.g., at least 1 day or at least 3 days up to 15 days or 10 days). The crystallization time can be established by methods known in the art such as by sampling the synthesis mixture at various times and determining the yield and X-ray crystallinity of precipitated solid.

Typically, the aluminosilicate SWY molecular sieve is formed in solution and can be recovered by standard means, such as by centrifugation or filtration. The separated aluminosilicate molecular sieve product can also be washed, recovered by centrifugation or filtration and dried.

As a result of the crystallization process, the recovered as-synthesized crystalline molecular sieve product contains within its pore structure at least a portion of the structure directing agent used in the synthesis.

The recovered as-synthesized molecular sieve may further be subjected to thermal treatment, ozone treatment, or other treatments to remove all or part of the structure directing agent used in its synthesis. Thermal treatment (e.g., calcination) of the as-synthesized aluminosilicate molecular sieve typically exposes the material to high temperatures sufficient to remove part or all of the structure directing agent, in an atmosphere selected from air, nitrogen, ozone or a mixture thereof in a furnace. The thermal treatment can be carried out at a temperature of from 300° C. to 800° C. (e.g., 400° C. to 650° C.) for a period of time ranging from 1 hour to 10 hours (e.g., 3 hours to 6 hours).

The aluminosilicate SWY molecular sieve may also be subjected to an ion-exchange treatment, for example, with aqueous ammonium salts (e.g., ammonium nitrates, ammonium chlorides, and ammonium acetates) in order to remove remaining alkali metal cations and to replace them with protons thereby producing the acid form of the molecular sieve. To the extent desired, the original cations of the as-synthesized material, such as alkali metal cations, can be replaced by ion-exchange with other cations. Preferred replacing cations can include hydrogen ions, hydrogen precursor (e.g., ammonium ions), and mixtures thereof. The ion-exchange step may take place after the as-made molecular sieve is dried. The ion-exchange step may take place either before or after a calcination step.

Characterization of the Molecular Sieve

SWY molecular sieves synthesized by the methods described herein can have a $SiO_2/Al_2O_3$ molar ratio of from 10 to 50 (e.g., 15 to 40, or 20 to 35). The silica-to-alumina molar ratio of zeolites may be determined by conventional analysis.

The synthesis methods described herein can produce aluminosilicate SWY crystals with a high degree of purity, and preferably are pure phase. As used herein, the term "pure phase" means that the aluminosilicate SWY molecular sieve composition can comprise at least 95% by weight (e.g., at least 97% by weight or at least 99% by weight) of molecular sieve with SWY topology, based on the total weight of the composition, as determined by powder XRD or NMR, or by other known methods for such determination. The remainder of the composition is non-SWY material which can include amorphous material, different crystalline phases, different framework types (e.g., undissolved FAU), or any combination thereof.

Crystals of the aluminosilicate SWY molecular sieves produced in accordance with the methods described herein can be uniform, with little or no twinning and/or multiple twinning or may form agglomerates.

Aluminosilicate SWY molecular sieve crystals produced in accordance with the methods described herein can have mean crystal size of 0.1 to 10 μm (e.g., 0.1 to 3 μm, or 0.5 to 5 μm, or 1 to 3 μm). The crystal size is based on individual crystals (including twinned crystals) but does not include agglomerations of crystals. Crystal size is the length of longest diagonal of the three-dimensional crystal. Direct measurement of the crystal size can be performed using microscopy methods, such as SEM and TEM. For example, measurement by SEM involves examining the morphology of materials at high magnifications (e.g., 1000× to 10,000×). The SEM method can be performed by distributing a representative portion of the molecular sieve powder on a suitable mount such that individual particles are reasonably evenly spread out across the field of view at 1000× to 10,000× magnification. From this population, a statistically significant sample of random individual crystals (e.g., 50-200) are examined and the longest diagonal of the individual crystals are measured and recorded. Particles that are clearly large polycrystalline aggregates should not be included the measurements. Based on these measurements, the arithmetic mean of the sample crystal sizes is calculated.

EXAMPLES

The following illustrative examples are intended to be non-limiting.

Example 1

0.70 g of a 45% KOH solution, 3.94 g of deionized water, 3.39 g of a 13.80% 1-methyl-1-[7-(trimethylammonio) heptyl]piperidinium hydroxide solution, and 1.00 g of Zeolyst CBV720 Y-zeolite ($SiO_2/Al_2O_3$ molar ratio=30) powder were mixed together in a Teflon liner. The resulting gel was stirred until it became homogeneous. The liner was then capped and placed within a Parr Steel autoclave reactor. The autoclave was then put in an oven heated at 150° C. under static conditions for 6 days. The solid products were recovered from the cooled reactor by centrifugation, washed with deionized water and dried at 95° C.

A SEM image of the as-synthesized product is shown in FIG. 1.

The as-synthesized product was then calcined inside a muffle furnace under a flow of air heated to 540° C. at a rate of 1° C./minute and held at 540° C. for 5 hours, cooled and then analyzed by powder XRD.

Figure 2:
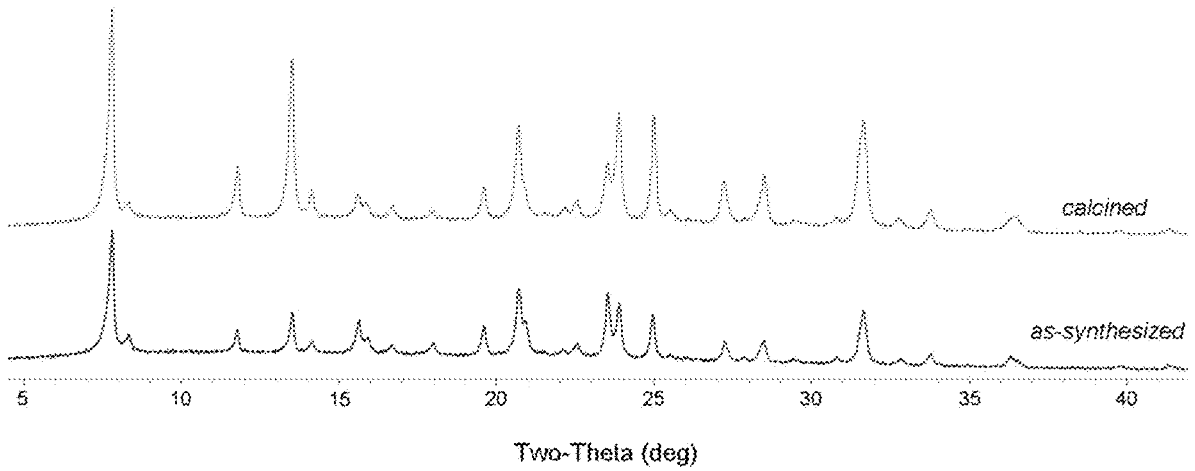
FIG. 2 shows a powder X-ray diffraction (XRD) pattern for as-synthesized SWY (bottom pattern) and calcined SWY (top pattern) materials of Example 1.

The powder XRD patterns for the as-synthesized product and the calcined product are shown graphically in FIG. 2, confirming that the material synthesized had the SWY structure.

The calcined material was treated with 10 mL (per g of zeolite) of a 1 N ammonium nitrate solution at 90° C. for 2 hours. The solution was cooled, decanted off and the same process repeated.

The ammonium-exchanged product after drying was subjected to a micropore volume analysis using $N_2$ as adsorbate and via the BET method. The molecular sieve exhibited a micropore volume of 0.30 $cm^3/g$.

Example 2

0.60 g of a 45% KOH solution, 6.17 g of deionized water, 5.09 g of a 13.80% 1-methyl-1-[7-(trimethylammonio) heptyl]piperidinium hydroxide solution, and 1.50 g of Zeolyst CBV720 Y-zeolite powder were mixed together in a Teflon liner. The gel was stirred until it became homogeneous. The liner was then capped and placed within a Parr Steel autoclave reactor. The autoclave was then put in an oven heated at 150° C. for 11 days. The solid products were recovered from the cooled reactor by centrifugation, washed with deionized water and dried at 95° C.

Analysis by powder XRD indicated that the product was a pure phase SWY molecular sieve.

Example 3

1.36 g of a 45% KOH solution, 7.94 g of deionized water, 2.54 g of a 13.80% 1-methyl-1-[7-(trimethylammonio) heptyl]piperidinium hydroxide solution, and 1.50 g of Zeolyst CBV720 Y-zeolite powder were mixed together in a Teflon liner. The gel was stirred until it became homogeneous. The liner was then capped and placed within a Parr Steel autoclave reactor. The autoclave was then put in an oven heated at 150° C. for 5 days. The solid products were recovered from the cooled reactor by centrifugation, washed with deionized water and dried at 95° C.

Analysis by powder XRD indicated that the product was a pure phase SWY molecular sieve.

Example 4

0.80 g of a 45% KOH solution, 3.89 g of deionized water, 3.39 g of a 13.80% 1-methyl-1-[7-(trimethylammonio) heptyl]piperidinium hydroxide solution, and 1.00 g of Zeolyst CBV760 Y-zeolite ($SiO_2/Al_2O_3$ molar ratio=60) powder were mixed together in a Teflon liner. The gel was stirred until it became homogeneous. The liner was then capped and placed within a Parr Steel autoclave reactor. The autoclave was then put in an oven heated at 150° C. for 6 days. The solid products were recovered from the cooled reactor by centrifugation, washed with deionized water and dried at 95° C.

Analysis by powder XRD indicated that the product was a pure phase SWY molecular sieve.

The invention claimed is:

1. A method of synthesizing an aluminosilicate molecular sieve of SWY framework topology, the method comprising:

(1) preparing a reaction mixture comprising:

(a) an aluminosilicate zeolite of FAU framework topology, (b) a structure directing agent [Q] comprising a 1-methyl-1-[7-(trimethylammonio)heptyl]piperidinium cation, (c) a source of an alkali metal cation [M], (d) a source of hydroxide ions [OH], and (e) water; and (2) heating the reaction mixture to obtain an aluminosilicate molecular sieve of SWY framework topology.

2. The method of claim 1, wherein the reaction mixture has a composition, in terms of molar ratios, as follows:

| | |
|---|---|
| $SiO_2/Al_2O_3$ | 20 to 100 |
| $Q/SiO_2$ | 0.05 to 0.50 |
| $M_2O/SiO_2$ | 0.10 to 1.00 |
| $OH/SiO_2$ | 0.10 to 1.00 |
| $H_2O/SiO_2$ | 10 to 80. |

3. The method of claim 1, wherein the reaction mixture has a composition, in terms of molar ratios, as follows:

-continued

| | |
|---|---|
| $SiO_2/Al_2O_3$ | 25 to 80 |
| $Q/SiO_2$ | 0.15 to 0.40 |
| $M_2O/SiO_2$ | 0.02 to 0.30 |
| $OH/SiO_2$ | 0.40 to 0.70 |
| $H_2O/SiO_2$ | 15 to 40. |

4. The method of claim 1, wherein the aluminosilicate zeolite of FAU framework topology is zeolite Y.

5. The method of claim 1, wherein an alkali metal of the alkali metal cation comprises potassium.

6. The method of claim 1, wherein the heating is conducted at a temperature ranging from 100° C. to 200° C.

7. The method of claim 1, wherein the heating is conducted under autogenous pressure.

8. The method of claim 1, further comprising calcining the aluminosilicate molecular sieve of SWY framework topology.

9. The method of claim 1, further comprising ion-exchanging the aluminosilicate molecular sieve of SWY framework topology.

* * * * *